Patented July 14, 1925.

1,546,117

UNITED STATES PATENT OFFICE.

KENNETH R. BROWN, OF TAMAQUA, PENNSYLVANIA, ASSIGNOR TO ATLAS POWDER COMPANY, OF WILMINGTON, DELAWARE, A CORPORATION OF DELAWARE.

EXPLOSIVE COMPOSITION AND PROCESS OF PREPARING THE SAME.

No Drawing.   Application filed September 15, 1924. Serial No. 737,915.

*To all whom it may concern:*

Be it known that KENNETH R. BROWN, citizen of the United States, residing at Tamaqua, in the county of Schuylkill and State of Pennsylvania, has invented certain new and useful Improvements in Explosive Compositions and Processes of Preparing the Same, of which the following is a specification.

My invention relates particularly to the production of an explosive obtained by dissolving a sugar or sugars in a mixture of glycerine and diglycerine and nitrating the resultant product.

It is known that the addition of a sugar to glycerine gives a product on nitration very similar to trinitroglycerine. However the freezing point of this mixture is somewhat lower than that of trinitroglycerine, and the cost is also lower than that of trinitroglycerine. U. S. Patent Number 1,301,105 granted to A. M. Comey, April 22, 1919 applies to the use of such a mixture of glycerine and sugar in the manufacture of explosives. It is also known that a mixture of glycerine and diglycerine gives a product on nitration which is much more resistant to freezing than either trinitroglycerine or a mixture of trinitroglycerine and nitrated sugars. The manufacture and use of tetranitrodiglycerine is the subject of U. S. Patents Nos. 969,159 and 978,443 issued to S. H. Fleming. By increasing the tetranitrodiglycerine content, a liquid explosive can be made which is practically freeze-proof. However, the increase in cost on using a nitroglycerine with such a high tetranitrodiglycerine content is quite high and the use of such an explosive is not economical. Various attempts have been made to produce a liquid explosive with desirable freezing properties and a comparatively low cost by mixing together the glycerine-sugar mixture (covered by Patent No. 1,301,105) and the glycerine-diglycerine mixture (covered by Patents Nos. 969,159 and 978,443) either before or after nitration. The results of these attempts have not proven very successful for reasons given below.

The object of my invention, therefore, is to produce a liquid explosive, similar in other properties to trinitroglycerine, but having a freezing resistance equal to or better than a tetranitrodiglycerine-trinitroglycerine mixture containing a high percentage of tetranitrodiglycerine, and at the same time having a low cost of manufacture.

Now, I have conceived the idea of dissolving sugar or sugars in a mixture of glycerine and diglycerine and nitrating the resultant product.

It was mentioned before that mixtures of glycerine, diglycerine, and sugars have been nitrated and used before. Cane sugar was the principal sugar ingredient used. The sugars were dissolved in the glycerine and this glycerine-sugar solution was mixed with a mixture of glycerine and diglycerine. On account of the solubility limitations of cane sugar in glycerine, it is impractical to dissolve more than 20% cane sugar in glycerine. Therefore, when this is mixed with a mixture of glycerine and diglycerine the sugar content is reduced. For example, if mixed in a 50-50 ratio, the sugar content is reduced to 10% or in a (75 glycerine-sugar—25 glycerine-diglycerine) ratio, the sugar content is reduced to 15%. Now, by dissolving the sugar in the glycerine-diglycerine mixture, which is the idea I have conceived, it is possible to keep the sugar at the maximum, about 20% and at the same time keep the diglycerine content to the figure desired. It has been found by experience that the maximum diglycerine content that can be successfully nitrated under practical conditions lies under 50%.

It has been shown by analysis that a mixture containing 80% glycerine and 20% sugar yields on nitration a mixture containing about 84% trinitroglycerine and 16% nitrated sugar. A mixture of 28% diglycerine and 72% glycerine gives on nitration a mixture containing 25% tetranitrodiglycerine and 75% trinitroglycerine. It can be seen, therefore, that when these two mixtures are mixed together in a 50-50 ratio, the nitrated sugar content is reduced to 8% and the tetranitrodiglycerine content reduced to 12.5%. It also follows, that if these two mixtures are brought together in different proportions, the nitrated sugar or the tetranitrodiglycerine content suffers at the expense of the other. Practically the same figures apply to a mixture of nitrated glycerine and diglycerine on the one hand and a mixture of nitrated glycerine and sugar on the other hand.

My invention overcomes this, in that I can keep the sugar content in the unnitrated mixture up to the maximum (about 20%) and vary the diglycerine content within the limits heretofore mentioned. If for example, I should dissolve 20 parts of sugar in 80 parts of a mixture containing 35% diglycerine and 65% glycerine, a mixture of the following composition would be obtained.

52% glycerine,
28% diglycerine,
20% sugar.

This on nitration would give a nitrated product of the following approximate composition:

57% trinitroglycerine.
25% tetranitrodiglycerin.
18% nitrated sugars.

By extensive experimentation, I have found that this liquid explosive obtained by nitrating a sugar or sugars dissolved in a mixture of glycerine and diglycerine otherwise resembles trinitroglycerine but has freezing resistance approaching that of a trinitroglycerine-tetranitrodiglycerine mixture with a high tetranitrodiglycerine content. This explosive can also be produced at a comparatively low cost.

I dissolve a quantity of sugar or sugars, such for example as cane sugar in a quantity of glycerine containing diglycerine. The mixture is then subjected to the action of a mixture of sulphuric and nitric acids. The nitrated product is allowed to separate. The waste acid is drawn off, the nitrated product washed with water and then washed with an alkaline solution to remove the last traces of acid. The nitration process is almost identically the same as for nitroglycerine containing nitrated sugars. In the manufacture of nitroglycerine containing nitrated sugars, experience has shown the necessity of using a small quantity of stabilizer to produce an explosive with a satisfactory stability. Acetanilide, diphenylamine, and urea have been used successfully as stabilizers. From 0.05% to 0.20% is required to produce a desirable stability. I have found that a stabilizer such as was mentioned before is also necessary to stabilize the product obtained on nitrating sugars dissolved in a mixture of glycerine and diglycerine. One tenth of one percent of diphenylamine added to the nitroglycerine mixture gave a satisfactory stability.

In carrying out my process, the procedure, may if desired, be as follows:

Example I. Twenty parts of cane sugar are dissolved in 80 parts of a mixture of glycerine and diglycerine of the composition 20 parts of diglycerine and 80 parts of glycerine.

Example II. Eighteen parts of cane sugar and 2 parts of glucose are dissolved in 80 parts of a mixture of 35 parts of diglycerine and 65 parts of glycerine.

Example III. Sixteen parts of cane sugar, 2 parts of glucose, and 2 parts of mannose are dissolved in 80 parts of a mixture of 35 parts of diglycerine and 65 parts of glycerine.

Example IV. Fourteen parts of cane sugar, 2 parts of glucose, 2 parts of mannose and 2 parts of xylose are dissolved in 80 parts of a mixture of 35 parts of diglycerine and 65 parts of glycerine.

Twenty parts of any of these examples are nitrated with 100 parts of mixed acid of the composition; sulphuric acid 55% and nitric acid 45%. When the nitration is complete, the nitrated product is allowed to separate out in the usual way. The waste acid is drawn off and the nitrated product washed with water at a temperature of about 50° C. The last traces of acid are removed by washing with a dilute sodium carbonate solution. When the nitroglycerine is neutral, the stabilizer is added. At times I have found it necessary to wash the product with a solution of sodium chloride in order to reduce the moisture content. The salt solution is allowed to settle out and the mixture of trinitroglycerine, tetranitrodiglycerine and nitrated sugars is then drawn off ready for use. I have found this nitrated product to have a moisture content and a stability comparable with that of a mixture of trinitroglycerine and nitrated sugars.

While I have described my invention and given detailed and specific examples, I do not limit myself to the four sugars herein mentioned, but include within the scope of my invention the dissolving of any sugar or sugars or mixtures of sugars in a mixture of glycerine and diglycerine, and the product resulting from the nitration. I do not limit myself to the proportions given herein. I may use different proportions of glycerine, diglycerine, and sugars. I may use acids of different concentrations, and different proportions of glycerine, and acid. Also, I may use different neutralizing agents.

Having described my invention, what I claim and desire to secure by Letters Patent is:

1. The process which comprises dissolving a carbohydrate in a mixture consisting of glycerine and diglycerine for subsequent production of an explosive by nitration of the resultant product.

2. The process which comprises dissolving a sugar in a mixture consisting of glycerine and diglycerine for subsequent production of an explosive by nitration of the resultant product.

3. The process which comprises dissolving cane sugar in a mixture consisting of glycerine and diglycerine for subsequent production of an explosive by nitration of the resultant product.

4. The process which comprises dissolving cane sugar and glucose in a mixture of glycerine and diglycerine, for subsequent production of an explosive by nitration of the resultant product.

5. The process which comprises dissolving cane sugar, glucose and mannose in a mixture of glycerine and diglycerine for subsequent production of an explosive by nitration of the resultant product.

6. The explosive obtained by dissolving a carbohydrate in a glycerine-diglycerine mixture and nitrating the resultant product.

7. The explosive obtained by dissolving a sugar in a glycerine-diglycerine mixture and nitrating the resultant product.

8. The explosive obtained by dissolving cane sugar in a glycerine-diglycerine mixture and nitrating the resultant product.

9. The explosive obtained by dissolving cane sugar and glucose in a glycerine-diglycerine mixture and nitrating the resultant product.

10. The explosive obtained by dissolving cane sugar, glucose and mannose in a glycerine-diglycerine mixture and nitrating the resultant product.

11. The explosive obtained by dissolving cane sugar, glucose, mannose, and xylose in a glycerine-diglycerine mixture and nitrating the resultant product.

12. The explosive obtained by dissolving sugar in a glycerine-diglycerine mixture, nitrating the resultant product and adding a stabilizer.

In testimony whereof he affixes his signature in the presence of two witnesses.

KENNETH R. BROWN.

Witnesses:
R. L. HILL,
ROE H. BROWN.